United States Patent
Di Sante et al.

(10) Patent No.: US 6,713,167 B2
(45) Date of Patent: Mar. 30, 2004

(54) MULTILAYER PRODUCT, ITS USE FOR THE PRODUCTION OF LIGHT, ACOUSTIC-INSULATED, SELF-SUPPORTING ARTICLES AND ARTICLES OBTAINED WITH SAID MULTILAYER PRODUCT

(75) Inventors: Giuseppe Di Sante, Roseto Degli Abruzzi (IT); Patrizio D'Ambrosio, Roseto Degli Abruzzi (IT); Mario Biggio, Roseto Degli Abruzzi (IT); Guerino Di Sante, Roseto Degli Abruzzi (IT); Cesare Di Domenico, Roseto Degli Abruzzi (IT); Gabriella Giovannelli, Roseto Degli Abruzzi (IT); Claudio Sfredda, Roseto Degli Abruzzi (IT)

(73) Assignee: Industrialesud S.p.A., Teramo (IT)

( * ) Notice: Subject to any disclaimer, the term of this patent is extended or adjusted under 35 U.S.C. 154(b) by 0 days.

(21) Appl. No.: 09/973,667

(22) Filed: Oct. 9, 2001

(65) Prior Publication Data
US 2002/0058452 A1 May 16, 2002

(30) Foreign Application Priority Data
Oct. 16, 2000 (IT) ......................... MI200A2227

(51) Int. Cl.⁷ ............... B32B 3/12; B32B 3/26; B32B 25/10; B32B 27/04; B32B 17/02; B32B 27/12; B32B 7/12; B32B 27/00; B32B 9/04; B32B 27/40; D04H 1/00; D04H 13/00; D04H 3/00; D04H 5/00; E04B 1/82; E04B 9/00

(52) U.S. Cl. ................... 428/292.1; 428/159; 428/160; 428/297.4; 428/299.4; 428/300.7; 428/304.4; 428/317.1; 428/319.3; 428/411.1; 428/423.1; 428/423.7; 181/284; 52/144

(58) Field of Search ............. 428/292.1, 297.4, 428/411.1, 423.1, 159, 304.4, 160, 300.7, 317.1, 319.3, 299.4, 423.7; 52/144; 181/284

(56) References Cited

U.S. PATENT DOCUMENTS

| | | | |
|---|---|---|---|
| 4,248,922 A | * 2/1981 | Shortway et al. | 428/159 |
| 4,273,911 A | * 6/1981 | Freudenberg et al. | 528/49 |
| 4,469,543 A | * 9/1984 | Segal et al. | 156/283 |
| 4,656,080 A | 4/1987 | Takahashi et al. | 428/215 |
| 4,938,819 A | * 7/1990 | Ishii et al. | 156/78 |
| 5,178,708 A | * 1/1993 | Hara et al. | 156/242 |
| 5,516,582 A | * 5/1996 | Hikasa et al. | 428/319.9 |
| 5,709,925 A | * 1/1998 | Spengler et al. | 428/198 |
| 5,942,321 A | * 8/1999 | Romesberg et al. | 428/300.7 |
| 6,287,678 B1 | * 9/2001 | Spengler | 428/297.4 |

* cited by examiner

*Primary Examiner*—Cynthia H. Kelly
*Assistant Examiner*—Camie S Thompson
(74) *Attorney, Agent, or Firm*—Hedman & Costigan, P.C.

(57) ABSTRACT

A multilayer product which comprises a first element consisting of a layer of spongy, semi-rigid polymer (A), impregnated on one or both sides with polyurethane resin (B), and inserted between two layers of glass fibre, natural fibre or a combination of glass fibre and natural fibre (C) coupled with the central layer (B) (A) (B), wherein the first element is coupled with at least a second element comprising a layer of spongy, semi-rigid polymer (A), wherein the second element is impregnated on one or both sides with polyurethane resin (B), and wherein the second element is coupled with an additional layer of glass fibre, natural fibre or a combination of glass fibre and natural fibre (C).

16 Claims, 2 Drawing Sheets

| | Layer | # | Code |
|---|---|---|---|
| | LINING FABRIC | 6 | F |
| | LINING GLUE | 5 | E |
| | VLIES | 4 | D |
| | GLASS FIBRE-JUTE | 3 | C |
| | RESIN | 2 | B |
| | PUR SHEET | 1 | A |
| | RESIN | 2' | B |
| | GLASS FIBRE-JUTE | 3' | C |
| | VLIES | 4' | D |

FIG. 1

| | Layer | # | Ref |
|---|---|---|---|
| | LINING FABRIC | 6 | F |
| | LINING GLUE | 5 | E |
| | VLIES | 4 | D |
| | GLASS FIBRE-JUTE | 3 | C |
| | RESIN | 2 | B |
| | PUR SHEET | 1 | A |
| | RESIN | 2' | B |
| | GLASS FIBRE-JUTE | 3' | C |
| | VLIES | 4' | D |

FIG. 2

| | Layer | # | Ref |
|---|---|---|---|
| | FABRIC | 7 | F |
| | GLUE | 8 | E |
| | VLIES | 9 | D |
| | GLASS FIBRE-JUTE | 10 | C |
| | RESIN | 11 | B |
| | PUR SHEET | 12 | A |
| | RESIN | 11' | B |
| | GLASS FIBRE-JUTE | 10' | C |
| | RESIN | 11'' | B |
| | PUR SHEET | 12' | A |
| | RESIN | 11''' | B |
| | GLASS FIBRE-JUTE | 10'' | C |
| | VLIES | 9' | D |

| | FABRIC | 7 | F |
|---|---|---|---|
| | GLASS FIBRE-JUTE | 10 | C |
| | RESIN | 11 | B |
| | PUR SHEET | 12 | A |
| | RESIN | 11' | B |
| | GLASS FIBRE-JUTE | 10' | C |
| | RESIN | 11" | B |
| | PUR SHEET | 12' | A |
| | RESIN | 11'" | B |
| | GLASS FIBRE-JUTE | 10" | C |
| | VLIES | 9' | D |

FIG. 3

| | GLASS FIBRE-JUTE | C | |
|---|---|---|---|
| | RESIN | B | |
| | PUR SHEET | A | PLANES |
| | RESIN | B | |
| | GLASS FIBRE-JUTE | C | |

FIG. 4

| | RESIN | B | |
|---|---|---|---|
| | PUR SHEET | A | |
| | RESIN | B | |
| | GLASS FIBRE-JUTE | C | |

FIG. 5

MULTILAYER PRODUCT, ITS USE FOR THE PRODUCTION OF LIGHT, ACOUSTIC-INSULATED, SELF-SUPPORTING ARTICLES AND ARTICLES OBTAINED WITH SAID MULTILAYER PRODUCT

The present application claims priority to Italian Patent Application Serial No. MI 2000A 002227, filed Oct. 16, 2000.

BACKGROUND OF THE INVENTION

The present invention relates to a multilayer product, called "Multipur", its use for the production of light, acoustic-insulated, self-supporting articles and the articles obtained with said multilayer product.

A typical application of the multilayer product according to the present invention is represented by all lining and fitting elements of car interiors such as for example the self-supporting lining for the cabin roof, or quite simply cabin, the door panels, rear shelf, boot or hatch back-door linings, jamb covers, sun-shields and generally all lining and fitting elements of car interiors, for which certain requisites must be satisfied such as lightness, self-supporting properties (i.e. the capacity of supporting its own weight, without the need for supporting structures), acoustic insulation and/or flexibility.

Light materials for the production of articles, in particular lining and fitting elements of car interiors, by means of a hot moulding process, are known in literature. A known material, light and mouldable, for the above use consists, for example, of a "sandwich" product which comprises a layer of polyurethane inserted between two layers of fibre glass and/or natural fibre impregnated with polyurethane resin; the two layers of fibre glass and resin, also called "mat", are coupled in continuous with the central layer consisting of polyurethane. Outside the layer of fibre glass and/or natural fibre and resin, there can also be other layers of light materials, glue or other fabric: the sandwich-structured sheet thus obtained, is subsequently hot moulded to obtain the desired element.

In particular, the glass fibre and/or natural fibre impregnated with thermo-sensitive polyurethane resin, is coupled in continuous on both surfaces of the polyurethane layer, causing the formation of a so-called sandwich.

The sandwich thus obtained, optionally also coupled with other layers of light fabric and/or other materials, is sent to the hot moulds where the desired article is produced.

The product thus obtained, although it has good lightness, self-supporting and acoustic-insulation properties, demonstrates uniformity of characteristics. This means that in every point of the structure subjected to hot moulding treatment, it has analogous lightness, acoustic-insulation and self-supporting properties.

This results in an inadequate adaptability inside the vehicle where it is necessary to have more rigid areas, with a minimum thickness, and less rigid areas with any thickness. In addition, there are areas in which the acoustic insulation is particularly necessary and areas where this characteristic is less desirable.

Furthermore, with the improvement of supply techniques, car manufacturers require that the products supplied, already pre-assembled, have additional components such as, for example; handles, sun-shields, light panels, etc.; under these conditions, the traditional products, obtained with the methods known in literature, have considerable problems relating to movement breakage, due to their limited mechanical strength.

SUMMARY OF THE INVENTION

The objective of the present invention is to identify a product which allows the drawbacks of the known art to be overcome and in particular to obtain an article in which there are extremely rigid zones and also zones which are still flexible.

The Applicant has surprisingly found that by using a particular type of multilayer product, it is possible to produce elements having areas with different physico-chemical characteristics.

In the case of a car cabin, for example, the multilayer product according to the present invention allows the production of an article in which the lateral parts are flexible and allow the expulsion of lateral air-bags situated between the roof and lining of the cabin, whereas the central part is extremely rigid and allows the positioning of light panels, switches, sunshields, etc.

An object of the present invention therefore relates to a multilayer product which comprises a first element consisting of a layer of spongy, semi-rigid polymer (A), impregnated on one or both sides with polyurethane resin (B), and inserted between two layers of glass fibre and/or natural fibre (C), coupled in continuous with the central layer (B) (A) (B), said first element being characterized in that it is coupled with at least a second element comprising a layer of spongy, semi-rigid polymer (A), impregnated on one or both sides with polyurethane resin (B), said second element being in turn coupled with a further layer of glass fibre and/or natural fibre (C).

The multilayer product according to the present invention therefore has a (B) (A) (B) (C) (B) (A) (B) structure, wherein A, B and C have the meanings defined above and wherein other elements consisting of the layers (A), (B) and (C), can be added to the outer sides of this structure, with the alternation specified above, and/or with different alternations.

In particular, in the multilayer product thus obtained, the spongy, semi-rigid polymer can be selected from polyurethane, polystyrene, polyester.

The spongy, semi-rigid polymer is preferably polyurethane.

It is even more preferably a polyurethane obtained by the reaction between a polyol and isocyanate with a density varying from 20 to 40 kg/m$^3$.

The polymer which forms the layer (A) can be the same in all the (A) layers or each (A) layer can be produced with a polymer which has different densities and different thicknesses.

The glass fibre can also be substituted by another natural fibre such as jute, sisal, coir or other equivalent materials.

The structure of the multilayer product according to the present invention (C) (B) (A) (B) (C) (B) (A) (B) (C) comprises the coupling, on the two outer sides of the coupled elements, of layers of light fabrics and/or covering vlies (D), thus obtaining a product with the following structure: (D) (C) (B) (A) (B) (C) (B) (A) (B) (C) (D).

The multilayer product thus obtained may also comprise the application on both outer sides of the sandwich, i.e. of the elements already coupled, or on only one of these, lining fabric, layers of anti-vibration material, etc.

The thickness of the layer (A) can vary from 4 to 18 mm and preferably from 5 to 7 mm.

The thickness of the layer (A) is even more preferably equal to 6 mm.

The layers of spongy, semi-rigid polymer (A) present in the multilayer product according to the present invention can have the same thickness or different thicknesses.

A further object of the present invention relates to the use of the multilayer product according to the present invention for the production of light, self-supporting, acoustic-insulated articles.

The present invention also relates to light, self-supporting, acoustic-insulated articles obtained by means of the hot moulding of the multilayer product according to the present invention.

In particular, these articles are lining or fitting elements of car interiors.

The present invention also relates to a process for the processing of the multilayer product, said process being characterized by applying different pressure concentrations in the different zones of the multilayer product, thus obtaining areas having different compression strength, flexibility and acoustic-insulation properties.

The main advantage of the multilayer product according to the present invention is that it allows the production of articles, in particular all lining and fitting elements for car interiors, having different flexibility and flexural strength properties depending on the various areas of the end-product.

BRIEF DESCRIPTION OF THE DRAWINGS

The characteristics and advantages of the multilayer product according to the present invention can be more clearly understood from the following detailed and illustrative description referring to the following figures.

Description of the enclosed figures:

FIG. 1 represents a sectional view of an embodiment of the product according to the state of the art;

FIG. 2 represents a sectional view of an embodiment of the multilayer product according to the present invention;

FIGS. 3, 4 and 5 represent a sectional view of further embodiments of the multilayer product according to the present invention.

DETAILED DESCRIPTION OF THE INVENTION

In particular, in FIG. 1, 1 indicates the layer of spongy, semi-rigid polymer (A), inserted between two layers of resin 2 and 21 (B), and glass fibre 3 and 3' (C). 4 and 4' indicate the layers of light fabric or vlies (D), whereas 5 indicates the layer of glue (E) and 6 the lining material (F).

FIG. 2 represents a sectional view of an embodiment of the multilayer product according to the present invention in which the layers which form the multilayer structure are as follows: 7 is the external lining material (F), 8 represents the glue (E), 9 and 9' are the two layers of light fabric or vlies (D), 10, 10' and 10" represent the layers of glass fibre or jute (C), 11, 11', 11" and 11'" represent the layers of resin (B) and 12 and 12' represent the layers of polyurethane (A).

According to an embodiment of the process according to the present invention, the following procedure is adopted: the polyurethane which forms the layer of spongy, semi-rigid polymer of the multilayer product, is prepared in a first step. The polyurethane sheets are then sent to a plant where the polyurethane sheet is coupled with a first layer of thermosetting polyurethane resin, the reinforcing fibre based on glass and/or natural fibre is subsequently applied. This coupling of glass fibre and/or natural fibre/resin/ polyurethane sheet layer is effected on both sides, upper and lower of the polyurethane sheet. A layer of resin is then applied on a second polyurethane sheet which is subsequently deposited on the upper or lower side of the pack described above. A new layer of glass fibre and/or natural fibre is subsequently deposited on the free side of said pack.

The deposition of a second element can be repeated various times depending on the number of layers required in the end-product, by inserting one or more planes or elements, structured according to FIGS. 4 and 5.

In particular, FIG. 4 represents a plane or element with double reinforcement, i.e. a plane which comprises the presence of the reinforcing fibre layer (C) on both sides of the element (B) (A) (B). FIG. 5, on the other hand, represents a plane or element with single reinforcement, where the layer of reinforcing fibre (C) is present on only one side of the element (B) (A) (B).

As described below, the protective vlies and/or lining material, with or without sponge already coupled, is then applied.

It is also possible to obtain an article in which the multilayer product has a varying number of layers in the different parts of the sheet, as the overlaying of a second element can only be effected on part of the sheet.

It is also possible to operate in a single step and in this case the vlies (9D) and glue (8E) of FIG. 2, are eliminated, obtaining a structure as represented in FIG. 3.

Also in this case, it is possible to insert various layers as in FIG. 4 and/or FIG. 5.

The multilayer sheet thus obtained is sent under hot moulds, between 90 and 180° C., thus activating the polyurethane resin and obtaining the multilayer product which is then coupled, in a continuous or semi-automatic system, on both sides, with fabrics and/or vlies. Finally, a layer of glue and the external lining material are applied on the upper side. The sheet of multilayer product thus obtained is sent to the relative forming mould where the desired end-product is obtained by means of hot moulding treatment.

The main advantage of the multilayer product according to the present invention is that it allows the production of articles, in particular all lining and fitting elements for car interiors, which have different flexibility and flexural strength characteristics according to the zones of the end-product itself.

A further advantage of the multilayer product according to the present invention is that it is extremely light, even thought it also maintains a high mechanical resistance.

Other advantages of the product according to the present invention relate to the versatility of the multilayer product and therefore the possibility of producing end-products having different thicknesses, geometrical shapes, etc., with excellent aesthetic results, a good acoustic effect and limited cost.

The product according to the present invention also allows articles to be obtained, characterized by self-supporting properties in the desired areas which are such as to enable the application of light panels, push-buttons, etc. without the need for any supporting element.

A further advantage of the product according to the present invention is that it can also be obtained by modulating the acoustic insulation of the various parts of the structure.

The lining fabrics of the panels obtained according to the present invention can either be coupled with sponges or with sponges and vlies and/or protective films, or covered with

What is claimed is:

1. A multilayer product which comprises a first element consisting of a layer of spongy, semi-rigid polymer (A), impregnated on one or both sides with polyurethane resin (B), and inserted between two layers of glass fibre, natural fibre or a combination of glass fibre and natural fibre (C) coupled with the central layer (B) (A) (B), wherein said first element is coupled with at least a second element comprising a layer of spongy, semi-rigid polymer (A), wherein said second element is impregnated on one or both sides with polyurethane resin (B), and wherein said second element is coupled with an additional layer of glass fibre, natural fibre or a combination of glass fibre and natural fibre (C).

2. The multilayer product according to claim 1, comprising a (B) (A) (B) (C) (B) (A) (B) structure, wherein A, B and C have the meanings defined above, and optionally other elements consisting of the layers (A), (B) and (C) are added to the outer sides of this structure, with the alternation specified above, with different alternations or with a combination of said alteration above and with different alterations.

3. The multilayer product according to claim 1, wherein said spongy, semi-rigid polymer is selected from the group consisting of polyurethane, polystyrene and polyester.

4. The multilayer product according to claim 1, wherein said spongy, semi-rigid polymer is polyurethane.

5. The multilayer product according to claim 1, wherein said spongy, semi-rigid polymer is a polyurethane having a density ranging from 20 to 40 kg/m$^3$.

6. The multilayer product according to claim 1, wherein said spongy, semi-rigid polymer which forms layer (A) is the same polymer in all the (A) layers.

7. The multilayer product according to claim 1, wherein said spongy, semi-rigid polymer which forms layer (A) is a polymer having different densities in the various (A) layers.

8. The multilayer product according to claim 1, wherein said glass fibre is substituted by jute, sisal, coir or other equivalent natural materials.

9. The multilayer product according to claim 1, comprising the coupling on both the outer sides of the coupled elements, of layers of light fabrics, covering vlies or a combination of layers of light fabric and covering vlies (D), obtaining a product with the structure (D) (C) (B) (A) (B) (C) (B) (A) (B) (C) (D).

10. The multilayer product according to claim 1 wherein both external sides of said multilayer product or only one side of said multilayer product comprises lining fabric or layers of anti-vibration material.

11. The multilayer product according to claim 1, wherein the thickness of layer (A) varies from 4 to 18 mm.

12. The multiplayer product according to claim 1, wherein the thickness of layer (A) varies from 5 to 7 mm.

13. The multilayer product according to claim 1, wherein the thickness of layer (A) is equal to 6 mm.

14. The multilayer product according to claim 1, wherein the layers (A) of spongy, semi-rigid polymer have the same thickness.

15. The multilayer product according to claim 1, wherein the layers (A) of spongy, semi-rigid polymer have different thicknesses.

16. Light, self-supporting, acoustic-insulated articles obtained by the hot molding of the multiplayer product according to any of the claims from 1 to 15.

* * * * *